UNITED STATES PATENT OFFICE.

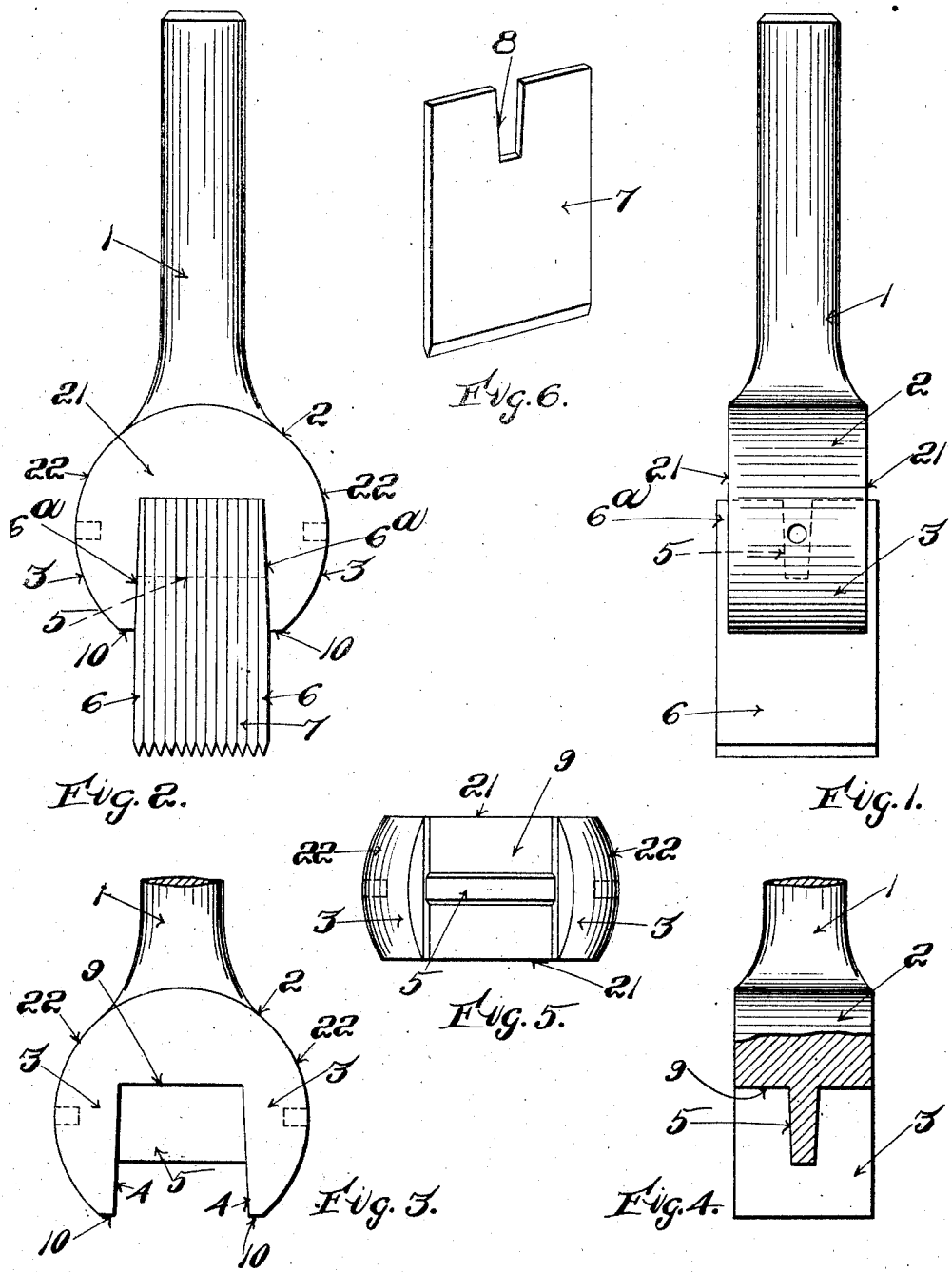

ENOS S. COSTA, OF QUINCY, MASSACHUSETTS.

SELF-TIGHTENING BUSHING-TOOL HOLDER AND TOOLS.

No. 878,776. Specification of Letters Patent. Patented Feb. 11, 1908.

Application filed November 1, 1907. Serial No. 400,305.

*To all whom it may concern:*

Be it known that I, ENOS S. COSTA, a citizen of the United States, residing at Quincy, county of Norfolk, State of Massachusetts, have invented a certain new and useful Improved Self-Tightening Bushing-Tool Holder and Tools, of which the following is a specification, reference being had therein to the accompanying drawings.

The invention is especially intended for application to tools in which two or more work-tools are employed in one holder and especially to tools which are used in work on granite, marble or iron work or the like, whether they are power driven tools or hand tools, such for instance as surfacer bush-chisels which are usually power driven, or hand bush hammers, but they are more especially intended for use with pneumatic power machines.

The invention is also adapted for use with double end hand bush hammers and small hand or machine bush-chisels.

The invention is an improvement upon the tool-holder and tool shown in Patent No. 843,931 issued to me February 12, 1907. In that patent the tool-holder was formed with a socket recess in the end of the head to receive the shanks of the tools, the socket recess having walls on all four sides. The holder of the construction shown in that patent is rather expensive of construction.

One object of the present invention is to provide a holder which shall be less expensive of construction than the one shown in that patent and which is adapted for quick and easy insertion of the work-tools and which shall also hold them firmly when inserted and from which, when desired, the tools can quickly be removed.

The invention will be fully understood from the following description taken in connection with the accompanying drawings, and the novel features thereof will be pointed out and clearly defined in the claims at the close of the specification.

In the drawings,—Figure 1 is a front elevation of a tool-holder used in connection with surfacer bush-chisels run by power and with tools fitted therein. Fig. 2 is a side elevation at right angles with Fig. 1. Fig. 3 is a side elevation of the tool-holder, the shank being partially broken away and the chisels removed. Fig. 4 is a front elevation partly in section of the tool-holder without the tools. Fig. 5 is a bottom end view of the holder.

Fig. 6 is a perspective view of one of the chisels.

Referring to the drawings,—1 represents the stock or shank of the holder of a surfacer bush-chisel and 2 the head which is bifurcated at the outer end forming two jaws or cheeks 3, 3, between which the chisels or other work tools are to be held. This head is preferably formed with its two opposite exterior sides 21 flat and parallel with each other and with the front and rear faces 22 convex as clearly shown in the drawings. The inner faces 4, 4, of the arms 3, 3, are tapered upwardly.

Extending downwardly from the head midway of its width and bridging the space between the two jaws 3, 3, and joining them or formed integral therewith is a tongue 5 which extends for some distance toward the lower end of the jaws, the length of the tongue preferably extending somewhat more than half the distance from the base of the opening between the jaws to the ends thereof. This tongue is made with downwardly tapering sides as clearly shown in Fig. 4. This tongue serves both to strengthen the holder by forming a rigid connection between the two arms and thereby not only strengthens but stiffens the same; it also serves as a lock for the chisels and prevents side motion thereof. The two outside chisels 6, 6, of the group are formed with the outer sides 6$^a$ of their shanks tapered to correspond with the tapered sides 4, 4, of the jaws of the holder. The inner faces of the outside tools 6, 6, are straight. The intermediate tools 7 which include all of the tools between the two outside tools are formed with parallel faces.

The tools 6, 7, are all formed with a tapered slot 8 in the base ends thereof corresponding with the tapered tongue 5 of the holder, the depth of the slots being equal to the length of the tongue so that when the tools are inserted in the head they will all fit over the tongue 5, the butt ends of the tools when driven home resting square against the bottom end 9 of the head so as to form a rigid stop for the tools and to avoid any excessive tightening. They may be made to fit so snugly that when first inserted in the holder by hand they will bind upon the sides of the head sufficiently to hold them in place before being driven clear back home and at the first blow of the tool after they are put in operation they will be driven home with the butt ends of the tools solid against the end of the head.

In order to prepare the tool for working, the operator places the tools in position in the fork of the holder and makes them secure by a light blow upon the ends which forces them in far enough to securely hold them by friction without driving them entirely home and then when the pneumatic power strikes the top of the shank and the ends of the tools strike upon the stone at the first blow when in operation, the shanks will be driven entirely home with the butt ends of the shanks solid against the head.

In order to enable the tools to be released from the holder they are made somewhat wider than the head, as shown in Fig. 1, each tool projecting a slight distance on both sides of the head. In order to release the work tools the holder is to be placed bottom up between two supports with the projecting rear ends of the tools resting on the supports while the holder hangs free between the supports. By a simple blow from a hammer upon the ends 10 of the jaws of the holder, the holder will be released from the tools. Preferably, the angle of taper of the inner face 4 of the jaws should be the same as the angle of taper of the tongue 5 and slot 8.

I claim as my invention:

1. A tool holder having a bifurcated head formed with two downwardly extending cheeks or jaws whose inner faces are flat and flare downwardly, a tongue which projects downward from the bottom of the throat between the jaws and bridges the throat between them intermediate their sides, in combination with a plurality of working tools having shanks which are formed with a tapered slot corresponding in shape and depth to the tongue on the holder, whereby the work tools may be wedged onto the tongue with their butt ends bearing against the solid end of the head, the outer faces of the two outside tools being tapered to correspond with the tapered faces of the jaws, the groups of tools filling the space between the jaws.

2. A tool holder having a bifurcated head formed with two downwardly extending cheeks or jaws whose inner faces are flat and flare downwardly, a tongue which projects downward from the bottom of the throat between the jaws, and of somewhat less length than the jaws, and bridges the throat between them intermediate their sides, in combination with a plurality of working tools having shanks which are formed with a tapered slot corresponding in shape and depth to the tongue on the holder, whereby the work tools may be wedged onto the tongue with their butt ends bearing against the solid end of the head, the outer faces of the two outside tools being tapered to correspond with the tapered faces of the jaws, the group of tools filling the space between the jaws.

3. A tool holder having a bifurcated head formed with two downwardly extending cheeks or jaws whose inner faces are flat and flare downwardly, a tongue which projects downward from the bottom of the throat between the jaws and bridges the throat between them intermediate their sides, in combination with a plurality of working tools having shanks which are formed with a tapered slot corresponding in shape and depth to the tongue on the holder, whereby the work tools may be wedged onto the tongue with their butt ends bearing against the solid end of the head, the outer faces of the two outside tools being tapered to correspond with the tapered faces of the jaws, the groups of tools filling the space between the jaws, the shanks of the tools being of greater width than the width of the jaws.

In testimony whereof I affix my signature in presence of two witnesses.

ENOS S. COSTA.

Witnesses:
ALICE H. MORRISON,
ALINE TARR